United States Patent [19]
Frisbie

[11] 3,731,201

[45] May 1, 1973

[54] CIRCUIT ARRANGEMENT FOR GENERATING RADIO FREQUENCIES

[75] Inventor: Jack G. Frisbie, McLean, Va.

[73] Assignee: International Telephone and Telegraph Corporation, New York, N.Y.

[22] Filed: Nov. 12, 1970

[21] Appl. No.: 89,049

Related U.S. Application Data

[63] Continuation of Ser. No. 689,987, Dec. 12, 1967, abandoned.

[52] U.S. Cl. ..................325/105, 325/161, 325/166, 331/165, 331/166, 307/246, 13/9

[51] Int. Cl. ..............................................H04b 1/04

[58] Field of Search......................325/105, 161, 166; 331/71, 112, 165, 166, 174; 307/260, 271, 246; 13/9

[56] References Cited

UNITED STATES PATENTS

| | | | |
|---|---|---|---|
| 2,555,305 | 6/1951 | Alty | 331/166 |
| 2,629,823 | 2/1953 | Grandmont | 331/166 |
| 3,089,967 | 5/1963 | Strull | 307/260 |
| 3,429,973 | 2/1969 | Carter et al. | 13/9 |

*Primary Examiner*—Albert J. Mayer
*Attorney*—C. Cornell Remsen, Jr., J. Warren Whitesel, Rayson P. Morris, Phillip A. Weiss, Delbert P. Warner and Percy P. Lantzy

[57] ABSTRACT

The invention provides a general purpose RF oscillator which may have any of many uses, depending upon bias and voltage levels which may be used. An LC circuit is repeatedly triggered into self-damped bursts of RF oscillations responsive to a relaxation oscillator which is recurringly triggered by a negative impedance device. The time at which the relaxation oscillator is triggered may be varied as a function of an analog signal to thereby produce a repetition rate modulation of the analog. Also, the negative impedance characteristic of the trigger device may be used to gain a tremendous amount of momentary amplification which provides an amount of power that is adequate to generate vast quantities of heat. Therefore, at the low voltage end of the scale, the RF generator may be used as a transmitter for walkie-talkies, and at the high voltage end of the scale the RF generator may be used as an oven. In between these two ends of the scale, the generator has many other uses.

5 Claims, 10 Drawing Figures

INVENTOR
JACK G. FRISBIE
BY [signature]
ATTORNEY

CIRCUIT ARRANGEMENT FOR GENERATING RADIO FREQUENCIES

This is a streamlined continuation of application Ser. No. 689 987, filed Dec. 12, 1967, now abandoned.

This invention relates to RF generators making use of the negative impedance zone of certain kinds of electronic switches, such as PNPN diodes, for example.

Relaxation oscillators are old and well known devices which produce sawtooth wave forms. They may turn themselves off and on with a timed regularity which is very often set by the charging or discharging of a capacitor or similar device. The relaxation oscillator may also be turned on in any known manner, as by means of a mechanical switch or an electronic device, for example. If the relaxation oscillator is coupled to a tuned circuit, it may cause a damped oscillation which begins when the oscillator turns on and ends in a time-related fashion. If the tuned circuit is tuned to a radio frequency, the damped oscillations may be used as an RF carrier.

This raises a number of interesting possibilities. For example, the peripheral circuits and the electrical parameters may be varied to produce a number of totally different unique effects.

Accordingly, an object of the invention is to provide new and improved relaxation oscillator controlled, RF generator circuits. In particular, an object is to provide circuits operable for many different purposes at both high and low power levels. In particular, an object is to provide extremely low cost component circuits having general utility in any of many different types of equipment applications.

Another object of the invention is to provide an RF transmitter. At one end of the scale, an object is to provide a very small, low power transmitter suitable for use in a pocket-sized communication instrument. Here, an object is to provide a small, personal telephone which may be easily carried in a pocket. At the other end of the scale, an object is to provide a high power RF transmitter suitable for long distance transmission.

Another object is to control a generation and dissipation of heat from the inventive circuit. In this connection, an object is to provide a completely cool device for use as an RF transmitter. Conversely, an object is to provide a device capable of generating very large amounts of heat. Here, an object is to provide an electric oven capable of heat treating a substance or product in any of many varying degrees. In this connection, an object is to provide an electric oven which may be controlled by fine adjustments.

Finally, an object is to accomplish all of the foregoing objects with simple, easily obtainable components. In fact, an object is to accomplish all of these ends with circuits made from virtually the same component types.

In keeping with an aspect of the invention, these and other objects are accomplished by a simple LC circuit tuned to the desired RF carrier frequency. A combination of an electronic switch having a high negative impedance,(such as a PNPN diode) and a capacitor set the relaxation oscillator's repetition rate. By modulating this pulse repetition rate with a voice signal, the oscillator controlled RF output signal becomes an analog of the voice signal which may be slope detected at any conventional receiver. By increasing the firing voltage of the electronic switch, the coil of the LC circuit may be made to radiate enough energy to perform a useful heat cycle function.

The above mentioned and other features and objects of this invention and the manner of obtaining them will become more apparent, and the invention itself will be best understood by reference to the following description of an embodiment of the invention taken in conjunction with the accompany drawings, in which:

FIG. 1 shows the characteristic curve of a PNPN diode;

FIGS. 2A, 2B and 2C graphically show a uniformly varying control voltage wave form which explains how the PNPN diodes may be forced to turn on and off to produce an analog signal modulation of a pulse repetition rate;

Figures 1, 5:
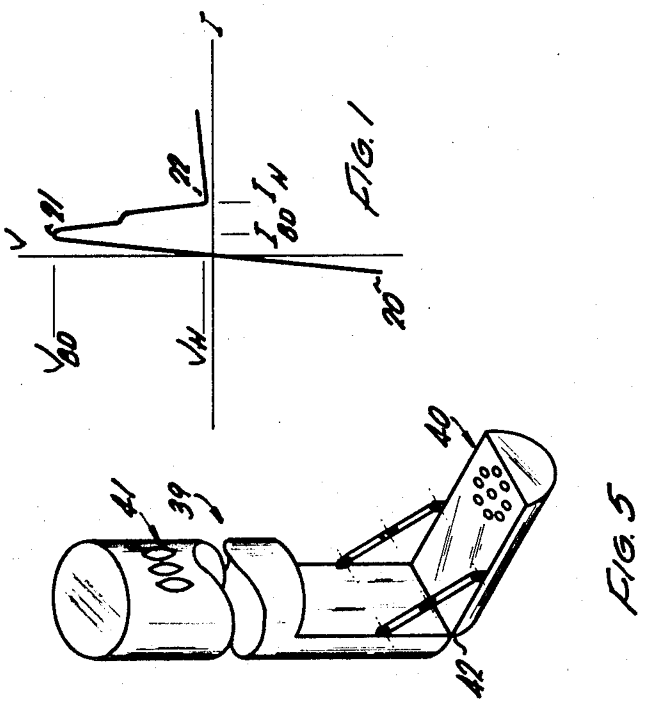
FIG. 5 is a personal telephone incorporating the transmitter of FIG. 4.

Exemplary of electronic switches suitable for use with the invention is a PNPN diode which has a characteristic curve, as shown in FIG. 1. When the diode is turned off (20), there is a very high impedance across its terminals. As a voltage applied across the diode terminals increases, very little additional current flows through the diode until a critical breakdown voltage $V_{BD}$ is reached at the point 21. During a transition through this region 20–21 of its operation, the diode displays positive impedance (i.e. a higher voltage encounters a higher resistance). However, as soon as breakdown occurs, there is a negative impedance while the diode is in transistion between the points 21, 22 since the voltage applied across its terminals drops to almost nothing while current through the diode increases with an avalanche. This negative impedance region is very important to the successful application of the invention to high power devices. The diode remains on as long as a minimum holding current $I_H$ flows through it. If current falls below the level $I_H$, the diode turns off.

Figures 2A, 2B, 2C:
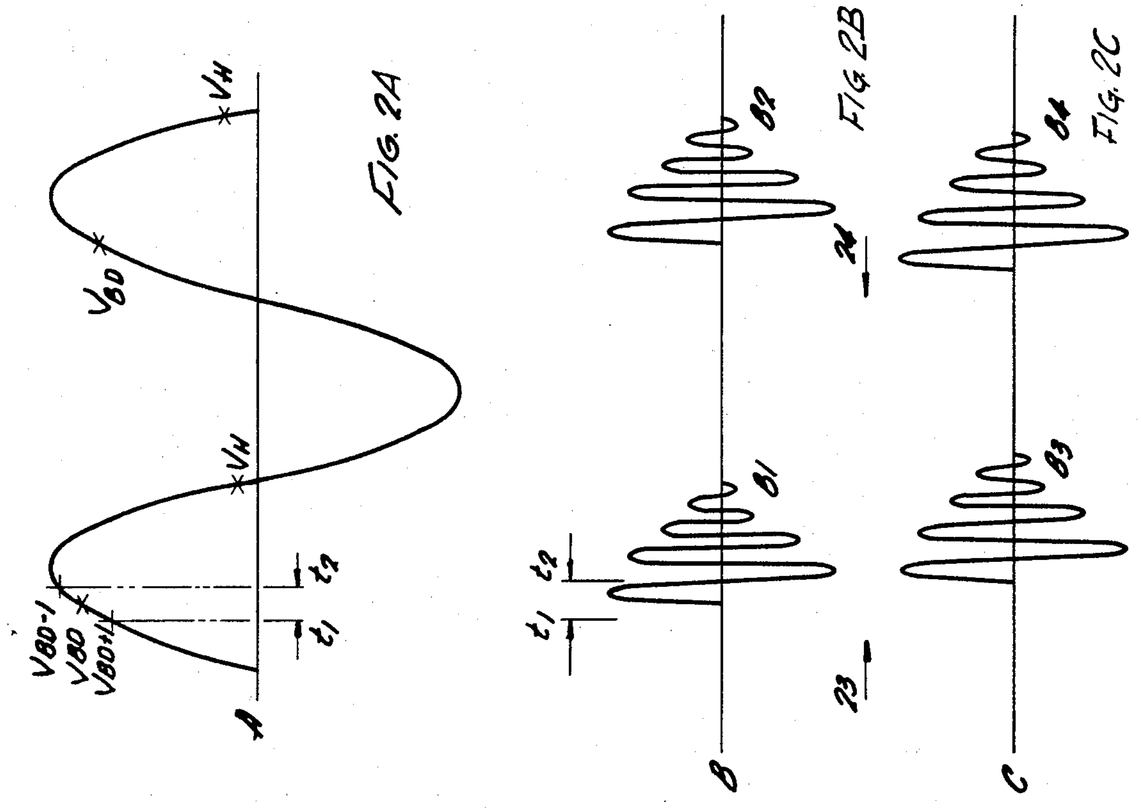

FIG. 2A shows a conventional sinusoidal wave form which is exemplary of many a.c. voltage wave forms. For example, it could be a graphical representation of the output of a standard commercial power generator; or, it could be the output of any tone generator. As long as the peak voltage is sufficiently high, the PNPN diode must fire on the upslope when the breakdown voltage $V_{BD}$ is reached. Thereafter, the diode holds itself "on" until the voltage on the down slope falls below the holding level $V_H$.

If a source of analog voltage is superimposed upon the a.c. signal of FIG. 2, it might add to or subtract from the a.c. voltage. For example, if the analog signal is one volt positive, the a.c. signal and the analog voltage add so that the breakdown voltage is reached 1 volt sooner as the a.c. voltage rises during its positive going transition. Thus, the diode fires at time $t_1$ when the a.c. voltage plus the one volt analog voltage equals the breakdown voltage at point 21 in FIG. 1. Conversely, if the analog signal is 1 volt negative, the a.c. signal must climb high enough to overcome the negative analog signal, and the diode fires at time $t_2$. Hence, it is seen that the combination of the a.c. and analog wave forms produces a time displacement of the PNPN diode firings.

FIG. 2B shows that a suitable source of damped oscillation may be triggered when the PNPN diode fires. Thus, at quiescence (no analog signal present) voltage $V_{BD}$ occurs midway between the time points $t_1$, $t_2$. The PNPN diode fires and an oscillator may be turned on momentarily to cause a burst of carrier frequency B1. Assuming that a steady state condition continues, later, during the next half cycle when the voltage again reaches $V_{BD}$ at the same phase angle, the PNPN diode fires to produce another burst of damped oscillation B2. However, if it is not a steady state condition (FIG. 2C), an analog signal voltage may subtract from the effective breakdown voltage $V_{BD}$ to delay the diode firing until time $t_2$, thus shifting the phase angle at which the burst B3 is triggered, as indicated by arrow 23. Maybe the signal voltage will add to the breakdown voltage during the next half cycle to shift the phase angle at which the burst B4 is triggered toward time $t_1$, as indicated by the arrow 24.

By inspection of FIG. 2C, it should be apparent that bursts B1 and B2 are further apart than bursts B3 and B4 by a time difference which is directly related to the analog signal voltage. If the analog signal voltage had changed in an opposite direction, the voltages would have added during the first positive half cycle and subtracted during the second positive half cycle. Then, the bursts B3 and B4 would have been further apart than the bursts $B_1$ and $B_2$. Thus, the bursts of damped RF oscillations have a pulse repetition rate which is modulated as a function of the applied analog signal.

Upon reflection, it should be apparent that the steady state frequency of the a.c. wave form (FIG. 2A) sets a time base. If undisturbed, the PNPN diode always fires when the voltage reaches the level $V_{BD}$ at the same phase angle or instant in every a.c. cycle. If an analog signal is superimposed upon the a.c. cycle, the basic phase angle in the cycle at which the PNPN diode fires is modulated between the limits $t_1$, $t_2$ to cause a time shift which is a function of the analog signal.

Figure 3A:
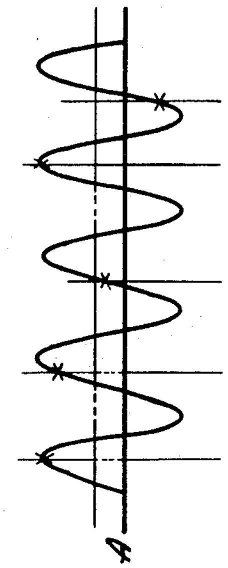
FIGS. 3A, 3B and 3C illustrate voltage wave forms which are useful for explaining how to produce a modulated analog of a speech signal.
Figure 3B:
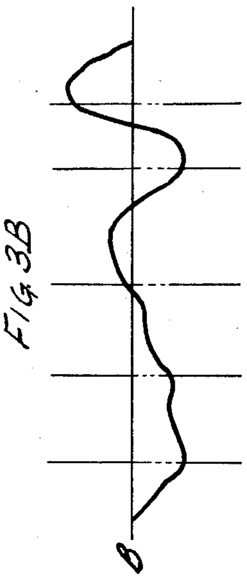
Figure 3C:
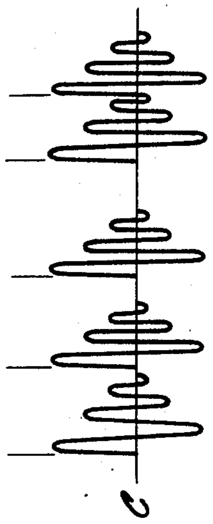

This pulse repetition rate modulation is shown in FIGS. 3A, 3B and 3C, where the a.c. control wave form appears at FIG. 3A. An analog signal (such as a voice signal) is shown at FIG. 3B. The nominal diode breakdown voltage is shown by a dot-dashed line in the wave form of FIG. A. However, the voltages of wave forms FIG. 3A and FIG. 3B combine to provide a breakdown voltage at the points which are marked on the curve of FIG. 3A by small $x$ marks. Each time that the combined voltages reach a breakdown potential (the small $x$-marks), the diode fires to trigger a damped burst of radio frequency energy. By inspection, it should be apparent that the time positions of the damped bursts shift as a modulation of the voice signal.

Figure 4:
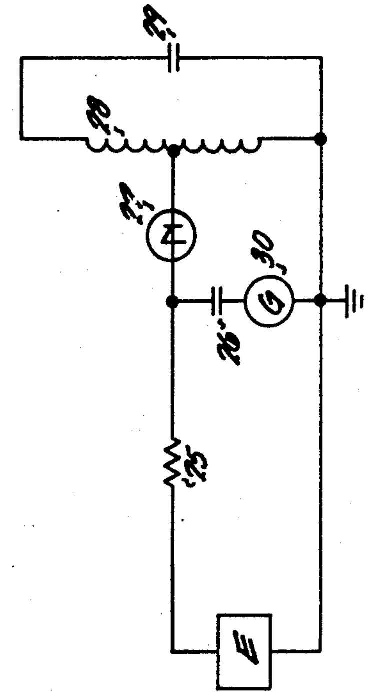
FIG. 4 is a miniature RF transmitter of a type suitable for use in a personal telephone.

FIG. 4 shows how this principle of pulse repetition rate modulation may be used to provide an RF transmitter. The basic elements of this circuit are, a source of voltage E, an RC network 25, 26 for setting an on-off time cycle having rising and falling voltages, a PNPN diode 27, an auto transformer inductance 28, a capacitor 29, and signal source 30. The inductor 28 and capacitor 29 are tuned to the desired RF carrier frequency. The signal source 30 may take any suitable form. For example, it might be a microphone having a resistance which varies as a function of a voice signal.

In operation, the capacitor 26 charges at a rate set jointly by the resistor 25 and the instantaneous resistance of the signal source 30, thus producing a regulatory voltage of alternating form which is of a somewhat sawtooth wave form having periodically rising and falling voltages. Whenever the capacitor voltage reaches the level $V_{BD}$, the diode 27 breaks down, and the energy stored in capacitor 26 is dumped into the LC circuit 28, 29. The analog signal voltage incrementally adds to and subtracts from the quiescent, capacitor controlled sawtooth voltage. Hence, breakdown occurs at different time positions set by the wave front of the rising ramp of the capacitor voltage curve. Each diode breakdown triggers a burst of damped RF oscillation because all of the energy stored in the capacitor 26 is dumped into the LC circuit 28, 29 when the diode 27 breaks down. This energy oscillates between the inductor and capacitor at the tuned frequency. As the energy in capacitor 26 is dissipated, the oscillations die down according to the natural damping characteristics of the circuit. Since the resulting voltage change is at an RF frequency, the energy radiates, and a nearby radio receiver can demodulate the original signal with a conventional slope detection.

The circuit of FIG. 4 is very small and low cost. The only components are a battery E, a resistor 25, a capacitor 26, a PNPN diode 27, an LC circuit 28, 29, and a microphone 30. With integrated circuit components, all of this may be made very small — say a cubic half-inch. Pocket radio receivers are also available in compatible sizes. Therefore, this circuit provides an ideal radio transmitter for use in a walkie-talkie. The transmitter of FIG. 4 and a conventional radio receiver are enclosed in a housing 39 of any convenient design, as shown in FIG. 5. For example, the signal generator or microphone 30 may be enclosed in one end 40, and the radio receiver may be enclosed in the other end 41 of the housing 39. To make a more compact unit, the housing may be hinged at 42 so that, when not in use, the entire unit may fold up to be no larger than a so-called pen-light, pocket flashlight. By adding a suitable pushbutton dial, the unit may be adapted to work into a mobile type telephone system, thereby providing a personal telephone.

The foregoing description covers a low cost circuit which is useful for radiating RF, as when it is desirable to deal with voltages at the voice signal levels. As indicated above, the negative resistance zone (21, 22, FIG. 1) in the characteristic curve of a PNPN diode is useful for increasing the output power. In units using a relatively low power consumption, such as personal telephones, the increase in power resulting from the negative impedance is very useful for extending the range of the device. However, when the power is increased to very high levels, an entirely new vista of circuit utilization is opened up by the great amount of amplification produced by the negative impedance device during its transition operations. Also, as indicated above, one object of the invention is to use standard, low cost, commercially available components regardless of how the circuit may be used; therefore, I have here shown the two circuits of FIGS. 4 and 6 which use the same 30 volt diodes.

Figure 6:
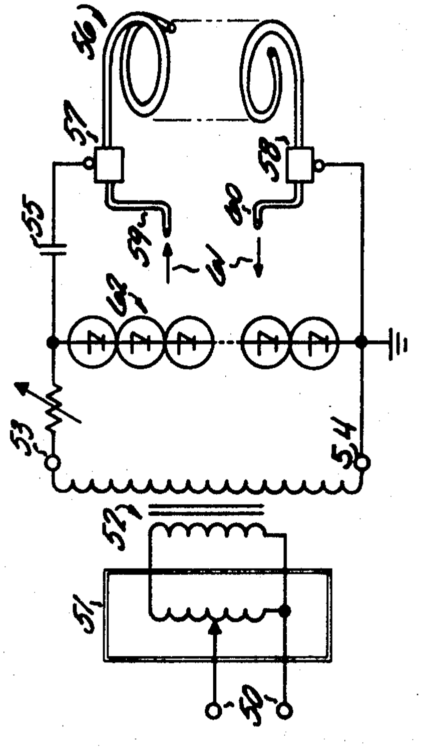
FIG. 6 is the circuit of an electrical furnace.

The high power circuit of FIG. 6 includes a source of power 50 which may be a standard connection to 60 cycle, 110 or 220 volt commercial power, for example. The box 51 is any suitable device, such as a variable transformer, for stepping up the voltage to any convenient level. The transformer 52 provides a conventional impedance matching and voltage transformation. In a circuit actually built and tested, the adjustments were such that the potential across the points 53–54 was in the order of 4 kilovolts. The LC circuit was formed by a 0.005 $\mu$f, 10,000 volt capacitor 55 and a coil of copper tubing 56. The tubing was conventional quarter inch copper tubing having eight turns, each turn being about 2¼ inches in diameter. Standard couplers 57, 58 are attached to the ends of the tubing. Rubber hose 59, 60 is coupled to force water 61 through the tubing 56 to prevent it from heating.

To provide a low cost, high voltage electronic switch, I connected a number of standard 30 V PNPN diodes in series, as shown at 62. If there is approximately 4 KV across the points 53, 54, approximately one hundred PNPN diodes may be connected in series at 62 to provide a switching voltage in the order of 3000 to 3500 volts. Under the foregoing assumptions, terminals 50 are connected to standard 60 cycle commercial power; therefore, the voltage across points 53, 54 also has a 60 cycle wave form similar to that shown in FIG. 2, the breakdown voltage $V_{BD}$ being about 3.5KV and the peak voltage being about 4KV. Hence, it follows that the electronic switch 62 will fire on each positive half-cycle when the voltage reaches $V_{BD}$ and turn off when the voltage falls below $V_H$.

In operation, the circuit of FIG. 6 accumulates a charge on the capacitor 55 while the diodes 62 are turned off. When the voltage across the diodes 62 rises to a cumulative $V_{BD}$ for the entire chain of diodes 62, they break down and form a short circuit across the tuned LC circuit 55, 56 so that the circuit goes into oscillation while the charge on capacitor 55 is dissipated. Since the oscillation is at a radio frequency, the coil 56 radiates power.

The negative impedance characteristic of the diodes is important to a successful operation. In greater detail, each PNPN diode in chain 62 displays about 2 ohms resistance when it reaches stability in its turned on condition. Thus, when operating at point 22 in FIG. 1, one-hundred series connected diodes have a total resistance of about 200 ohms, which is enough to prevent the shock excitation necessary to produce oscillation in the tuned circuit formed by capacitor 55 and coil 56. However, the heating power is not primarily generated when the diodes operate at point 22, but is generated when they go through the negative impedance region 21, 22 during which there is a high level of amplification. Therefore, instead of providing a resistive damping of oscillations, the diodes appear to contribute power to the shock-excitation of oscillation in the tuned circuit.

Very good results were produced in the various experimental circuits constructed according to the teachings of the invention. In the walkie-talkie of FIG. 4, the transmitting range was accurately controlled over the distances of approximately 200 to 500 yards. No conditions were found which would indicate that the range could not be extended to any reasonable distance. Also, the frequency control was very stable so that no unwanted field of RF interference was detected as a result of the operation of the transmitter.

No significant changes were detected between the diodes of the two circuits of FIGS. 4 and 6. Each experimental circuit used the same diode type and neither circuit displayed a tendency to heat the diodes any more than the other circuit. The embodiment of FIG. 6 was a relatively small laboratory model, and it generated enough heat to melt a steel bar approximately the size of a conventional fountain pen. Moreover, it was found that the heat penetration could be controlled to a degree such that the oven could heat selectively treat, say, the teeth on a gear without penetrating fully through the gear.

While the principles of the invention have been described above in connection with specific apparatus and applications, it is to be understood that this description is made only by way of example and not as a limitation on the scope of the invention.

I claim:

1. A circuit arrangement for generating radio frequencies, and suitable for use in for example a radio telephone, comprising an oscillator circuit tuned to a radio frequency and arranged to generate a self-damped burst of r.f. energy in response to being shock excited by way of an input source, first means providing said input source, said first means including a voltage source, means operatively coupled to the voltage source for storing current, and negative impedance switch means coupled between said tuned circuit and said storage means, said switch means having characteristics causing it to turn-on responsive to the voltage thereacross reaching a predetermined level, the arrangement of said switch means in being coupled between said storage means and said tuned circuit being such as to cause said tuned circuit to be shock excited responsive to said switch means turning-on by reaching said predetermined level, and second means including a source of analog signal voltage coupled to said storage means for varying the rise time of the voltage across said switch means as a function of the analog signal, thereby correspondingly varying the time required for the voltage to reach said predetermined level.

2. The circuit of claim 1 wherein said source of analog signal comprises a source of voice frequency of non-uniformly varying voltage to produce a corresponding non-uniform time displacement of the turn-on of said negative impedance switch means.

3. The circuit of claim 1 wherein said negative impedance switch means comprises at least one PN PN diode.

4. An electrical heating arrangement comprising first means for developing voltages at kilowatt levels from a source of alternating current, negative impedance switch means coupled across said source, said switch means comprising a plurality of serially connected negative impedance devices, the devices of said plurality having cumulative characteristics by which the plurality turns on and off as a function of the voltage from said first means, second means coupled to said negative switch means and to said first means for accumulating an electrical charge while said switch means is off, a tuned r.f. circuit coupled to said charge accumulating means wherein said accumulated charge is applied to said tuned r.f. circuit to cause same to oscillate at power radiating levels, and wherein the heat radiation power developed from said tuned circuit is primarily generated when said switch devices of said switch means, in turning-on, pass through the negative impedance operating range thereof, with said switch means in said operating range contributing power to the shock-excitation oscillation in the tuned circuit.

5. The device of claim 4 wherein said tuned R.F. circuit comprises a coiled tube and coolant circulated through said coiled tube.

* * * * *